Sept. 10, 1968     R. P. SMITH     3,400,607
VEHICLE CONTROL ASSEMBLY
Filed Dec. 20, 1965     3 Sheets-Sheet 1
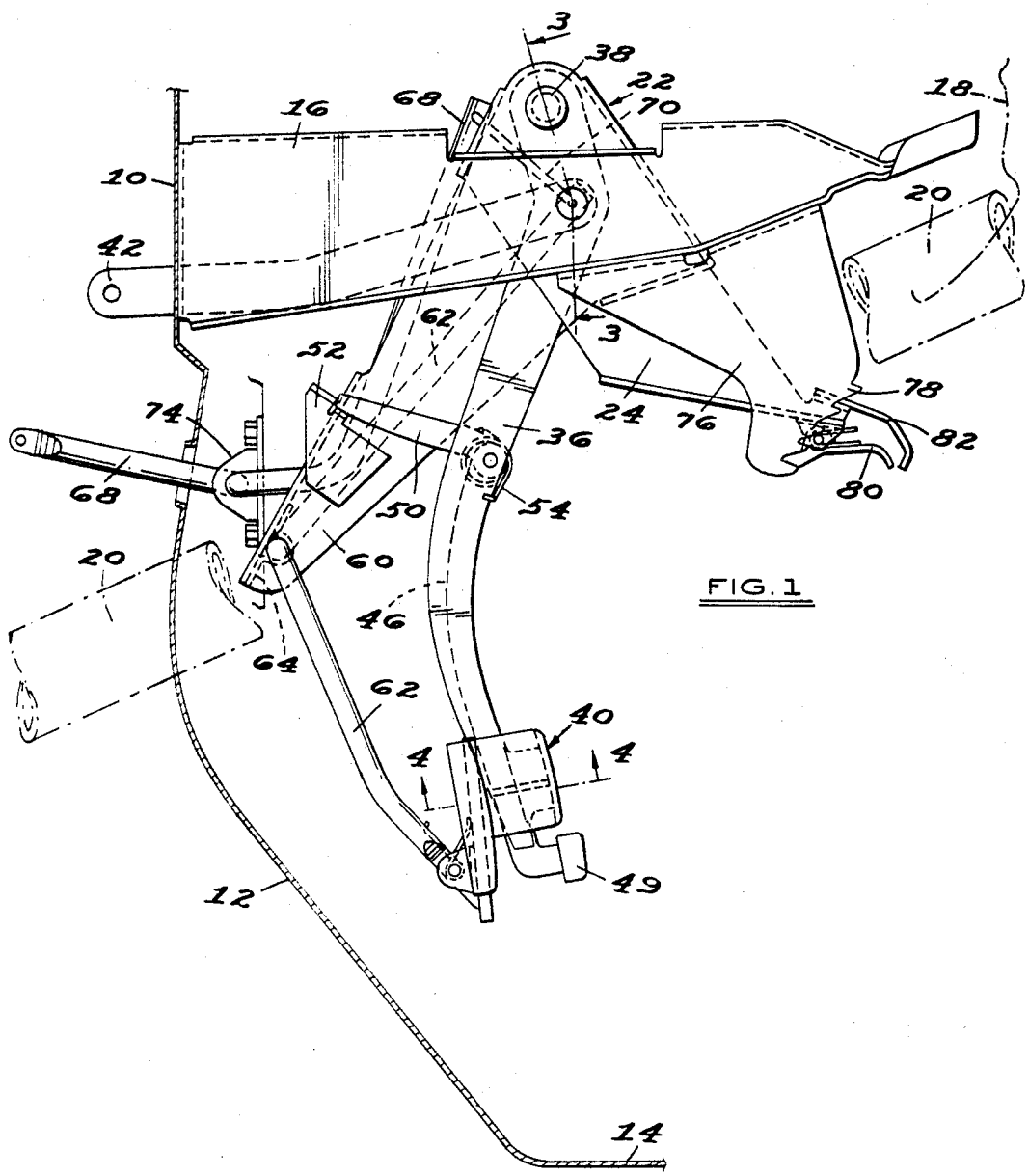
FIG. 1
FIG. 4
RAYMOND P. SMITH
INVENTOR
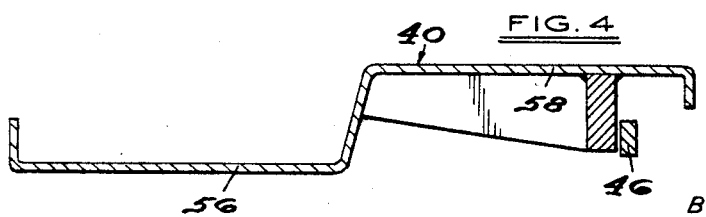
BY
ATTORNEYS

RAYMOND P. SMITH
INVENTOR

Sept. 10, 1968 R. P. SMITH 3,400,607
VEHICLE CONTROL ASSEMBLY
Filed Dec. 20, 1965 3 Sheets-Sheet 3
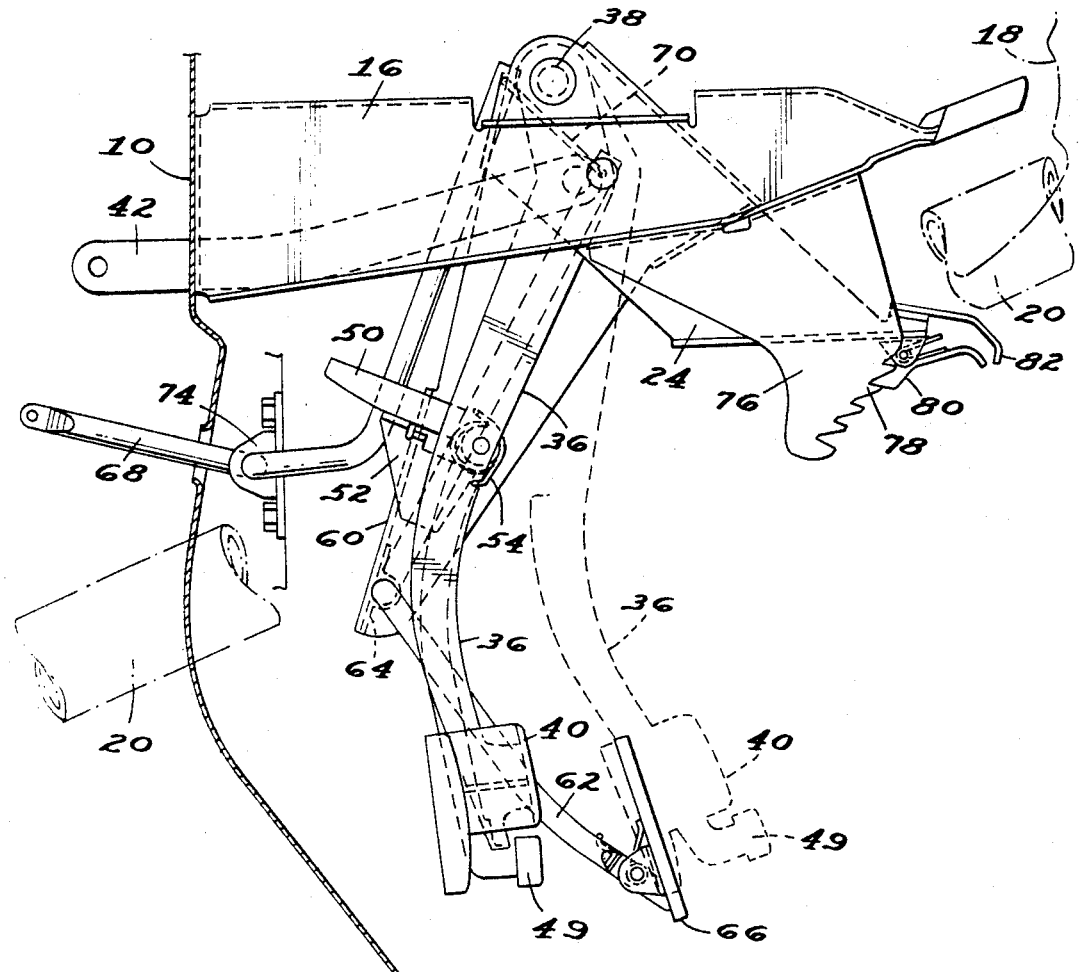
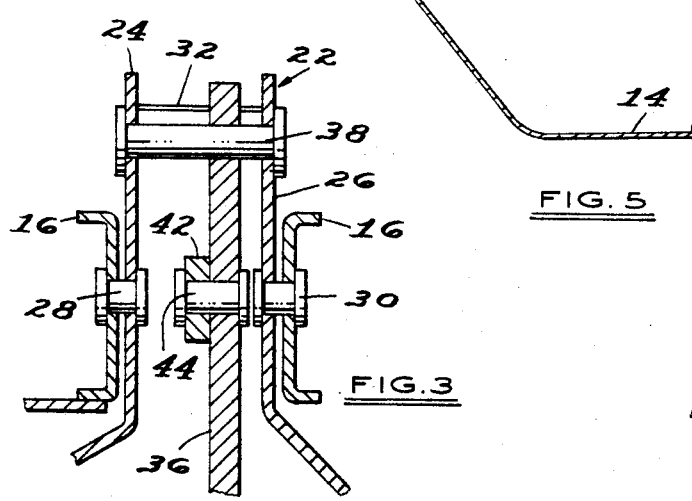
RAYMOND P. SMITH
INVENTOR
BY John R. Faulkner
Clifford L. Sadler
ATTORNEYS 3,400,607
VEHICLE CONTROL ASSEMBLY
Raymond P. Smith, Southfield, Mich., assignor to The Ford Motor Company, Dearborn, Mich., a corporation of Delaware
Filed Dec. 20, 1965, Ser. No. 514,867
3 Claims. (Cl. 74—560)

ABSTRACT OF THE DISCLOSURE

An adjustable pedal assembly for a motor vehicle including a portion which provides a rigid footrest when the adjacent pedal is not depressed.

---

The present invention relates generally to control devices for motor vehicles, and more particularly to means for mounting control pedals.

In the conventional automotive vehicle, pedals are provided for controlling the brakes and engine throttle. If the vehicle has a standard transmission, then a clutch pedal may also be provided. These pedal controls are operated by the driver. In order for the driver to obtain the most advantageous position for working these controls, the vehicle's front seat is usually slidably mounted on a seat track with means for retaining the seat along the track in a number of set positions.

The adjustment provided by moving the seat along the seat track does not accommodate all vehicle operators due to obvious differences in anatomical dimensions. Therefore, the present invention provides an improvement over conventional vehicles by providing pedal controls that are movably mounted so that the driver may select an appropriate spacing between the seat and the pedals commensurating with the length of his legs.

In the presently preferred embodiment of this invention, the brake and accelerator pedals are mounted on a support member which, in turn, is pivotally supported on vehicle body structure. The support member for the pedals may be pivoted to bring the pedals closer to or more distant from the driver.

The present invention may be used in conjunction with a vehicle having a movable seat and an adjustable steering wheel. Such an arrangement would provide the ultimate in accommodation for the vehicle operator.

The adjustable pedal mechanism of this invention may also be used in a vehicle having a stationary seat in which pedal relocation is used in place of the accommodation usually provided by an adjustable seat. A vehicle having a permanent seat location has many advantages. For an example, the safety belts may be secured to the seat rather than to the floor pan. In addition, certain manufacturing economies can be realized in the body structure which secured the seats.

The many objects and advantages of the present invention will become apparent upon consideration of the following description and the accompanying drawings, in which:

FIGURE 1 is a side elevational view of a pedal mechanism for a vehicle constructed in accordance with the present invention;

FIGURE 3 is a sectional view taken along section lines 3—3 of FIGURE 1;

FIGURE 4 is a sectional view taken along section lines 4—4 of FIGURE 1; and

FIGURE 5 is a side elevational view corresponding to FIGURE 1 but showing the pedals located in an alternate position.

Figure 2:
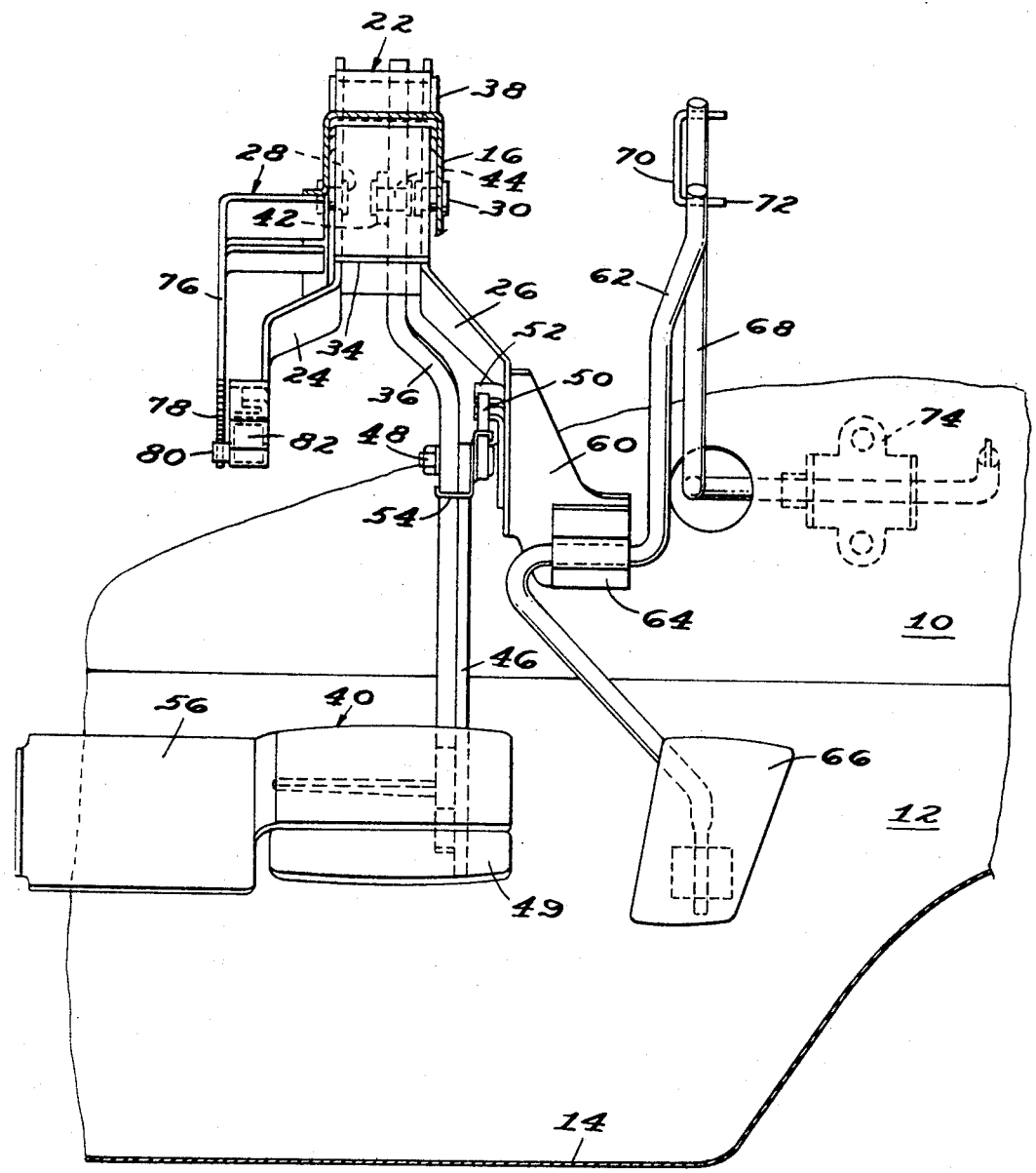
FIGURE 2 is an elevational view of the pedal mechanism of FIGURE 1.

Referring now to the drawings for a more detailed description of this invention, FIGURE 1 illustrates a movable pedal control mechanism for a motor vehicle. The vehicle of FIGURE 1 includes a body having a fire wall portion 10. Other portions of the body include the toe board 12 and the floor board 14. A structural member 16 is welded to the fire wall 10 and extends rearwardly into the passenger compartment. Member 16 provides a support for the instrument panel. The padded dash portion of the instrument panel is indicated by dotted line 18. The structure 16 also supports a steering column 20.

A pedal support assembly 22 comprises left and right sheet metal members 24 and 26 as indicated in FIGURE 3. The members 24 and 26 are pivotally supported on the structure 16 by pivot pins 28 and 30. The side portions 24 and 26 of the pedal support assembly 22 are interconnected by sheet metal members 32 and 34.

A brake pedal 36 is pivotally supported on the support assembly 22 by a pivot pin 38. The pedal lever 36 depends from the pin 38 and terminates with a pedal pad 40 at its lower end. A push rod 42 is linked to the pedal lever 36 by a pivot pin 44. It is important to note that the axis of the pivot pin 44 coincides with the axis for the pivot pins 28 and 30. Push rod 42 extends forwardly through the fire wall 10 and is connected to a brake master cylinder.

A release lever 46 is pivotally connected to the brake lever 36 by a bolt 48. The lever 46 extends downwardly parallel to the brake lever 36 and terminates at a release pad 49 that is situated just below and slightly outwardly of the brake pad 40 away from the toeboard 12. The lever 46 is of angled configuration having a forwardly extending portion 50 that is adapted to engage a bracket 52 welded to the pedal support 26. A small coil spring 54 is interposed between the brake lever 36 and the release lever 46 at the bolt 48. The spring 54 tends to rotate the lever 46 in a counterclockwise direction as seen in FIGURE 1. This movement causes the end of the lever portion 50 to engage the bracket 52.

As seen in FIGURE 4, the pedal pad 40 has laterally spaced portions comprising a foot rest portion 56 on the left-hand side and a brake applying portion 58 on the right-hand side. The engagement between the member 50 and the bracket 52 prevents the brake lever 36 from being rotated about the pin 38 toward the toe board 12. This makes a rigid supporting member out of the brake lever 36 and pad assembly 40 so that the pad portion 56 may be used as a foot rest. In order to apply the brakes, it is only necessary to lightly tap the release pad 49 at the end of the lever 46, in order to swing lever portion 50 out of engagement with the bracket 52. This happens automatically when the driver steps on the brake applying pad portion 58 due to the proximity of that portion to the release pad 49. When the release pad 49 is touched, member 50 swings upwardly and the pedal lever 36 may be pivoted about the pin 38 in a conventional brake applying manner.

As indicated in FIGURE 2, the right-hand sheet metal member 26 extends downwardly and slightly to the right of the support structure 16. An extension 60 is welded to the portion 26. An accelerator lever 62 is bent from bar stock and has an intermediate fulcrum portion that is pivotally mounted on the extension 60 by a clamp 64. The lower end of the accelerator lever 62 supports an accelerator pad 66 that is in general side-by-side relationship to the brake pad 40. The upper end of the accelerator lever 62 is connected to an accelerator linkage 68 by a U-shaped wire link 70. Link 70 has a lower transversely extending portion 72 that engages the lever 62 and is in axial alignment with the pivot pins 28, 30 and 44. The accelerator linkage 68 is supported on a clamp 74 and is connected to the throttle of the vehicle's engine.

The support structure 16 has a portion 76 that extends downwardly to the left of the pedal support assembly 22. The left-hand sheet metal member 24 of the assembly 22 also extends downwardly in the general region of portion 76 of the structure 16. The edge of the structure portion 76 terminates in a series of ratchet teeth 78 that are engageable by a spring pressed pawl 80 that is carried by portion 24 of the pedal support assembly 22. A grasping member 82 is positioned next to the pawl 80 and provides a means for the vehicle operator to move the pedal support assembly 22. When the driver pinches the pawl 80 against the member 82, it becomes disengaged from the ratchet teeth 78 permitting the pedal support assembly 22 to swing as a unit about the pivot pins 28 and 30.

In FIGURE 1, the pawl 80 is in the lowermost notch formed between the ratchet teeth 78. In this position, the brake pedal pad 40 and accelerator pedal pad 66 are in their forwardmost position. When the pedal support assembly 22 is moved in a counterclockwise direction to its limit, the pawl 80 is engaged in the uppermost notch of the ratchet teeth 78 as seen in FIGURE 5. In this position, the pedal pads 40 and 66 are closest to the driver and a maximum distance from the toe board 12.

In FIGURE 5, the brake pedal pad 40 is shown in dotted lines to indicate its released position. When the brake is applied, the pedal pad 40 is in the solid line position. This view also illustrates the manner in which the release lever portion 50 is moved out of engagement with respect to the bracket 52 to permit brake application.

In summary, the preferred embodiment of the present invention provides a pedal support having the pedals supported on a member which, in turn, is pivotally connected to vehicle body structure. By swinging the support member about its pivots, the pedals may be moved close or farther away from the vehicle operator. This permits the operator to adjust the pedals to a comfortable position appropriate to the length of his legs. The actuating linkage for the brakes and accelerator are pivotally connected on an axis that coincides with the pivot axis of the support member whereby movement of the pedal support member does not change the relationship between the pedals or cause actuating of the brakes and throttle control.

The attached drawings and foregoing description presents the presently preferred embodiment of this invention. For illustrative purposes, the invention has been shown in association with a vehicle having only an accelerator and brake pedal. Modification to incorporate a clutch pedal is also within the scope of this invention. In such a modification, the clutch pedal would be pivotally mounted on the assembly 22 and would be linked to the clutch actuator by means having a pivot coincident with the axis of the pivot pins 28 and 30.

Other modifications and alterations of the invention are within the scope of the following claims.

I claim:
1. A control mechanism for a vehicle comprising a first support member to be connected to the body of said vehicle,
a second support member pivotally connected to said first member,
a first lever and a second lever pivotally connected to said second support member,
an actuating member connected to said first lever by pivot means having a common axis with a pivotal connection between said first and said second support members,
releasable engagement means interposed between said first and said second support members and constructed to retain said members in a set angular relationship,
said first lever comprising a depending brake pedal,
said first lever pivotally supporting a release lever,
said release lever having one end portion adjacent to one end of said first lever,
said release lever having another portion engageable with said second support member,
said release lever being pivotal out of engagement with said second support member upon brake application.
2. A control mechanism for a vehicle according to claim 1 and including:
a footrest means extending laterally from the depending end of said brake pedal having a portion laterally spaced apart from said one end portion of said release lever.
3. A control mechanism for a vehicle comprising a first support member to be connected to the body of said vehicle,
a second support member pivotally connected to said first member,
a first lever and a second lever pivotally connected to said second support member,
an actuating member connected to said first lever by pivot means having a common axis with the pivotal connection between said first and second support members,
releasable engagement means interposed between said first and second support members and constructed to retain said members in a set angular relationship,
said first lever comprising a depending brake pedal,
a footrest means extending laterally from the depending end of said brake pedal and constructed to support the foot of the vehicle operator at a time when the vehicle brakes are not applied, said footrest means comprising a generally upwardly and rearwardly facing channel member constructed to receive a portion of the vehicle operator's foot and to prevent its lateral slipping therefrom.

References Cited
UNITED STATES PATENTS

| | | | |
|---|---|---|---|
| 787,530 | 4/1905 | McComb | 74—539 |
| 904,148 | 11/1908 | Potter | 74—539 |
| 2,609,705 | 9/1952 | Fletcher | 75—562.5 |
| 3,242,763 | 3/1966 | Buchwald | 74—560 |
| 3,282,125 | 11/1966 | Dully | 74—512 X |

MILTON KAUFMAN, *Primary Examiner.*